April 30, 1968 R. B. GOSNELL 3,380,406
COMPOSITE DESIGN FOR TRANSPARENT ARMOUR
Filed April 28, 1965 2 Sheets-Sheet 1
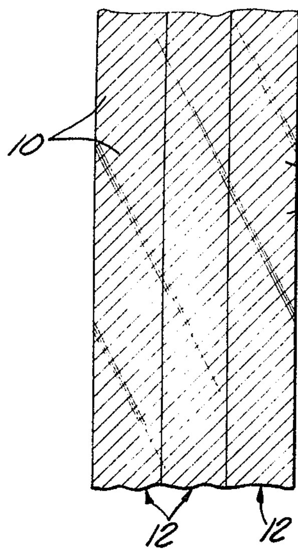
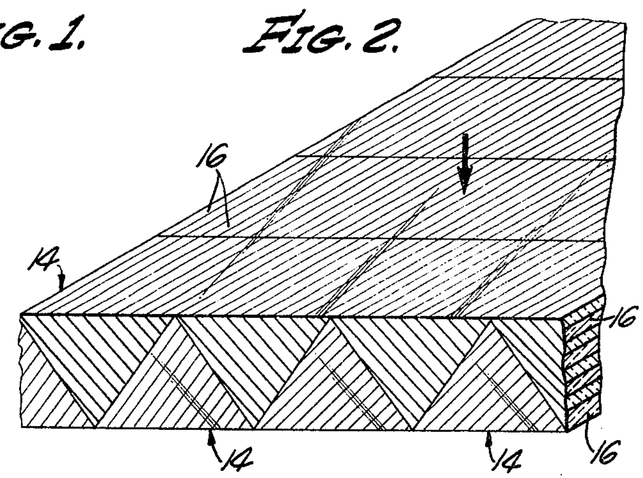
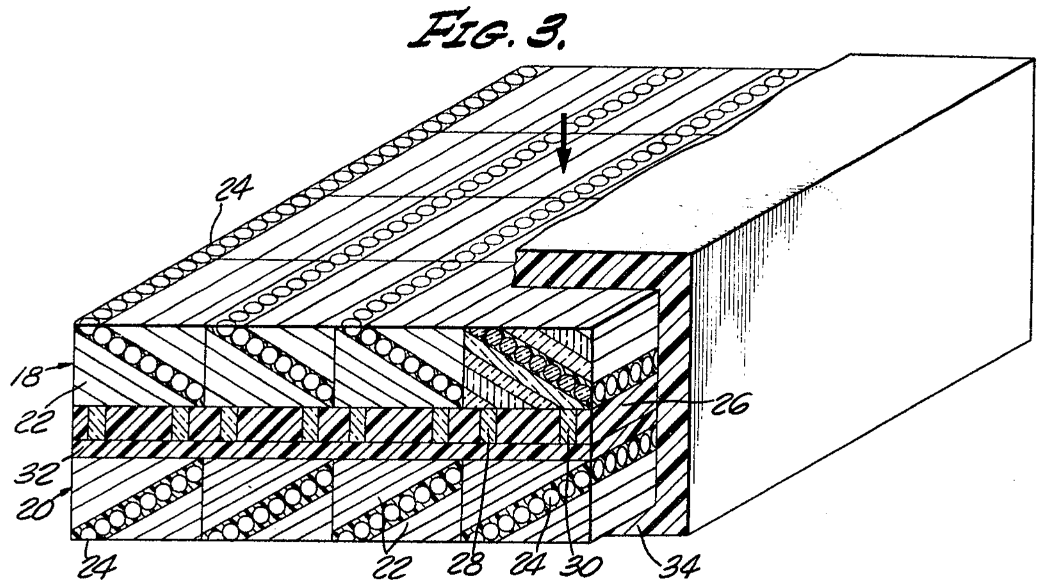
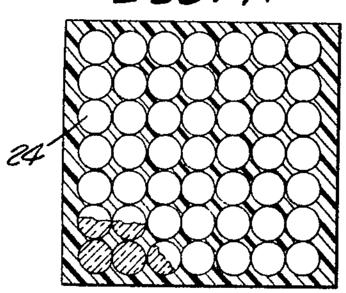
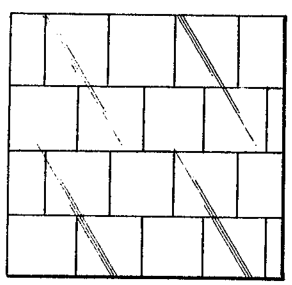
REX BEACH GOSNELL
INVENTOR.
BY Lyon & Lyon
ATTORNEYS COMPOSITE DESIGN FOR TRANSPARENT ARMOUR
Filed April 28, 1965 2 Sheets-Sheet 2
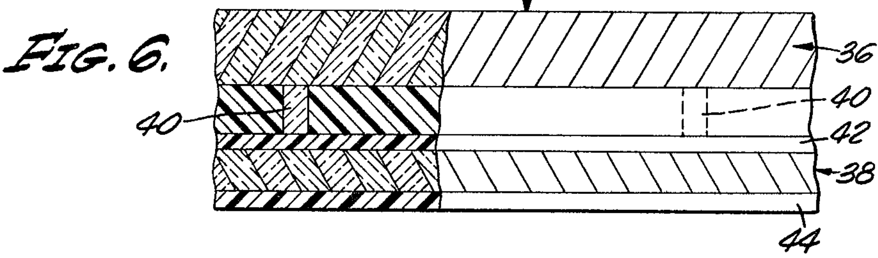
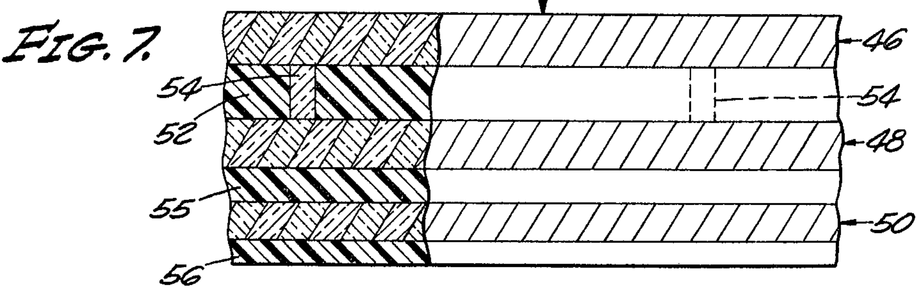
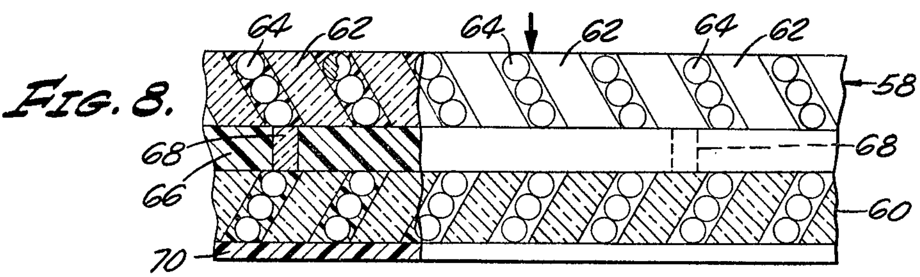
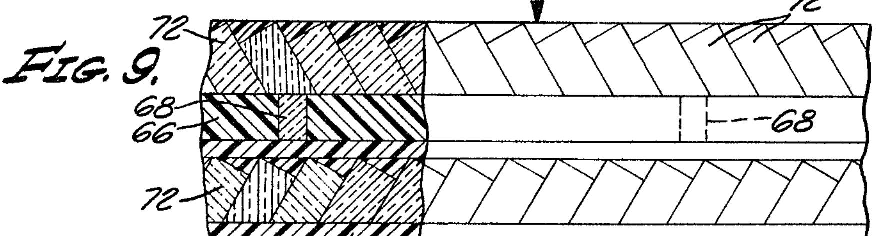
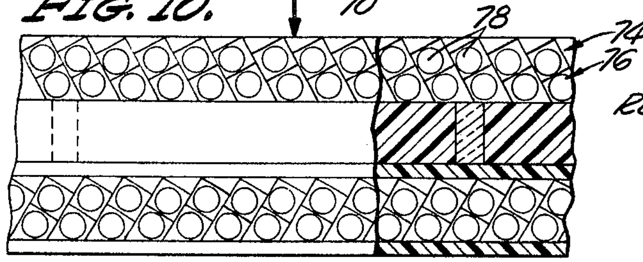
REX BEACH GOSNELL
INVENTOR.
BY Lyon & Lyon
ATTORNEYS United States Patent Office 3,380,406 Patented Apr. 30, 1968

3,380,406

COMPOSITE DESIGN FOR TRANSPARENT ARMOUR

Rex Beach Gosnell, San Diego, Calif., assignor to Whittaker Corporation, Los Angeles, Calif., a corporation of California Filed Apr. 28, 1965, Ser. No. 451,441
18 Claims. (Cl. 109—80)

ABSTRACT OF THE DISCLOSURE

This patent describes a novel transparent armor material having a surface adapted to receive impact comprising a layer of an organic high molecular weight polymeric matrix having contained therein a plurality of high modulus reinforcing members having at least one major plane surface disposed at an acute angle with respect to the surface of the armor adapted to receive impact.

This invention relates to novel lightweight armor adapted to provide protection against high speed projectiles.

Various bullet resistant glasses and high tempered glass-resin laminates have been proposed for protection against high speed projectiles. All of these materials, as well as steel boiler plate, have been found to be penetrated quite readily by a high velocity bullet, and in many cases with little apparent reduction in projectile velocity. In addition, these materials tend to disintegrate upon bullet impact, thereby producing additional high speed particles in the form of fragments from the armor material itself.

According to the present invention, a transparent composite armor material has now been fabricated by laminating glass or other high modulus transparent materials with a polymer binder, using the high modulus material in the form of, for example, thin plates or prisms constituted of thin plates and disposing them within the composite in such a way that at least one major plane surface of the high modulus material is at an acute angle to the outer surface of the composite. This system has been found to possess many advantages in reflection of shock stress and non-propagating failure.

Accordingly, it is an object of this invention to provide a novel composite transparent armor material.

More particular, it is an object of this invention to provide an armor material containing a high modulus material having a surface positioned at an acute angle with respect to that surface of the armor adapted to receive impact.

Still another object of this invention is the provision of a transparent armor material which will resist penetration by high speed projectiles and without the production of other high speed particles.

These and other objects of this invention will become apparent from the detailed description which follows.

The composite armor of this invention comprises at least one layer of high molecular weight organic polymeric material having contained therein a plurality of high modulus members, generally in the form of thin sheets, at least one major surface of which is at an acute angle with respect to the surface of the composite. The high modulus members placed at an angle to the surface of the composite function to turn the projectile as it strikes the multiple interfaces. While not bound by any theory, it is believed that the turning or tipping motion of the projectile is also partially derived from the reflection of the shock pressure by the slanted layers of high modulus material. The high modulus members are thus the origin of several different forces all of which combine to stop the projectile. The high modulus members also serve to reinforce the armor material, increasing its structural integrity.

The invention will be better understood by reference to the accompanying drawings depicting several preferred embodiments of the armor material of my invention, the side intended to receive bullet impact being indicated by an arrow and in which:

FIGURE 1 is a cross-sectional view of an embodiment of the invention wherein the high modulus material is in the form of thin glass sheets 10 disposed at a 45° angle with respect to the surface upon which the bullet impacts. The glass sheets are held together by very thin polymer coating (not shown). In the embodiment shown in FIGURE 1, three individual layers 12 of the glass sheets are bonded together to form a single composite transparent armor material.

FIGURE 2 shows a perspective view of another embodiment wherein the high modulus material is in the form of elongated glass prisms 14 of triangular cross section each consisting of thin plates 16 held together by very thin adhesive coatings of polymer. As shown, several sections of the armor material may be placed end-to-end to increase the area protected from bullet impact.

FIGURE 3 shows a perspective view with a portion broken away for clarity of illustration, of still another embodiment wherein two layers, 18 and 20, composed of several sheets of glass 22 and a layer of glass spheres 24 are bound by polymer, and are separated from each other by a polymer layer 26 containing glass columns 28 and 30. The composition of these glass columns is chosen so that they are possessed of differing fracture stress. Thus, as the shock produced by the bullet impact proceeds into these columns one will break first. This is a planned device to assist in the deflection of the projectile. This embodiment is of particular value in stopping an armor piercing shell. The second layer of the composite material aids in stopping the inner core of such a shell. Layers 32 and 34 are uniform polymer layers to aid in containing spall caused by bullet impact.

FIGURE 4 is a section taken along the plane of one of the sphere layers 24 in FIGURE 3.

FIGURE 5 shows a plurality of sections of the armor material assembled in the form of staggered rows to increase the available impact area.

FIGURE 6 is an end view in a partial cross-section of an embodiment where two layers 36 and 38, composed of thin glass sheets adhered to each other by polymer, are separated by a polymer layer containing glass columns having unlike fracture stress. One of the columns is shown at 40. The glass sheets in each layer are bonded with a polymer, and the lower layer 38 is both overcoated 42 and undercoated 44 with the polymer to contain any spall caused by bullet impact.

FIGURE 7 is an end view in partial cross-section of an embodiment in the form of three layers 46, 48 and 50, composed of thin glass sheets adhered to each other by polymer. Layers 46 and 48 are separated by a polymer layer 52 containing glass columns of unlike fracture stress. One of the columns is shown at 54. Layers 48 and 50 contain glass sheets at angles and bonded with a polymer. The layers 48 and 50 are separated by a polymer layer 55 as well as undercoated with polymer layer 56 to aid in containing spall.

FIGURE 8 is an end view in partial cross-section of an embodiment wherein in layers 58 and 60, the high modulus glass sheets 62 are separated by alternating layers of small spheres 64. The glass sheets and spheres are bonded together by a polymer and two individual layers thereof are again separated by a resin layer 66 containing glass columns of unlike fracture stress, one column being shown at 68. The lower polymer layer 70 is adapted to contain spall.

FIGURE 9 is an end view in partial cross-section of an embodiment generally similar to that of FIGURE 5 except that the glass sheets 72 are cut at right angles to the upper edge of the sheets to provide a sawtooth glass surface within the polymer bonded layer.

FIGURE 10 shows an end view in partial cross-section of an embodiment similar to that of FIGURE 8 except that the glass is in two parts 74 and 76 to provide a double sawtooth effect, and small spheres 78 are contained within each glass sheet.

Any glass, including alumina silicate glass, or other transparent high modulus material such as the ceramics or refractory materials may be effectively used in this invention. The modulus referred to herein refers to elasticity, or more particularly, the stress-strain ratio which is commonly called "Young's modulus." The transparent plates used in this invention are said to possess a high modulus since relatively great stress is required to produce a small deflection (strain).

The armor material of this invention is generally assembled as follows. A plurality of the thin glass sheets, usually from about 0.05 to 0.2 inch thick, are placed in a post-type jig, the glass being alternated with very thin plies of resin on the order of from about 0.004 to about 0.01 inch in thickness. Layers of small glass spheres may be interposed. Alternatively, the spheres may be glued into the glass prior to positioning in the jig. The top of the jig is set in place and the assembly is transfered to a press where it is heated under pressure to the laminating temperature of the polymer (or the curing temperature in the case of a thermosetting polymer). The laminate is then cut up in a diamond saw to provide the desired angle between its surface and the imbedded glass sheets. Thereafter, polymer layers containing glass columns of equal fracture stress or resin layers containing spall may be joined to the basic laminate by heating or adhesives.

If desired, the individual glass sheets may be washed and primed prior to being placed in the jig. For example, a 10% alcoholic potassium hydroxide solution may be used as a cleaner, and a 0.5% solution of aminopropyltriethoxysilane as the primer.

To more clearly illustrate the invention, the following example is presented. The present invention may take many forms and numerous modifications in the arrangement of the high modulus members, spheres and polymer layers will be apparent to those skilled in the art from the herein contained description of my invention. Accordingly, the example should not be regarded as limiting in any way.

EXAMPLE 1

A transparent composite armor material was prepared by laminating 0.04" x 1.0" x 3.0" glass plates at an angle of 45° with respect to the surface of the armor, using an epoxy resin as a matrix, (a diglycidyl ether of 2, 2-bis (4-hydroxyphenyl) propane and cured with methane diamine) containing 2.2 parts of the amine curing agent menthane 100 parts resin. The particular specimen was prepared with three layers of diagonal glass (each 0.75" thick) as shown in FIGURE 1. The laminate was cured at 10 p.s.i. for 2 hours at 200° F., and then cut in the manner described above. The specimen was then tested by firing a Springfield model O3-A3 rifle (30–06) into the specimen from a distance of 50 feet. The armor specimen was shattered by the impact. However, an aluminum witness plate positioned at the rear of the specimen was not penetrated by the bullet or by any of the fragments. The bullet was recovered in the immediate area and was curled and flattened by the tipping action resulting from impact with the composite.

Specimens are prepared, one having the figuration shown in FIGURE 5 and the other that of FIGURE 7. The resin used to bind the glass and for the spall layers has the formulation

| | Parts |
|---|---|
| Maleic acid-ethylene glycol polyester dissolved in styrene | 90.0 |
| Styrene | 10.0 |
| Benzoyl peroxide | 0.5 |

The laminates are cured for 4 hours at 75° F. and then for 1 hour at 200° F. Upon the firing of a bullet into the specimens, the results were similar to those obtained in Example 1.

The polymer material which may be employed as the matrix in the transparent composite armor material of this invention may be a thermosetting polymer such as an epoxy or styrenated polyester, or a thermoplastic polymer such as polymethyl acrylate, polymethyl methacrylate and polyethyl acrylate, a co-polymer of styrene and an allyl ester, polychlorotrifluoroethylene, tetrafluoroethylene-hexafluoropropylene copolymers and polyethers. These polymers completely fill all of the spaces between the high modulus material within the armor material. Various suitable curing agents may be employed along with the thermosetting polymers in order to assure complete cross-linking of the polymer. Typical of such curing agents are the amines, such as menthane diamine, triethylenetetramine and diethanolamine and the peroxides. The epoxy resin polymers are preferred because the armor obtainable therefrom is completely transparent and free of light scattering at normal temperatures. The diglycidyl ether of 2,2-bis-(4-hydroxyphenyl) propane (sold by Shell Chemical under the name "Epon 828") is particularly suitable. The polyester polymers used are of the common unsaturated type based on maleic acid and an alkylene glycol, such as those sold under the name "Laminac 4101" by American Cyanamid, and "Vibrin 156" by Naugatuck Division of U.S. Rubber.

The resin in the spall layers and in the layer containing the glass columns may be the same as that used to join the individual glass sheets. Other common resins used in the glass laminating art may also be used, including polyvinyl butyral.

The composition of the glass used in the columns of unequal fracture stress may be readily ascertained by those skilled in the art from the available physical property data of glass provided in the literature.

The high modulus material may be in the form of thin sheets or glass prisms (constructed of alternate layers of glass and binder as shown in the drawings). In addition, it will be apparent that many other configurations wherein a major surface of the high modulus materials is disposed at an angle of less than 90°, and generally of from about 30° to about 75°, to the surface of the armor adapted to receive the bullet impact can be utilized. Thus, glass of triangular, square, rhombic, rectangular, pentagonal and other cross-sectional configuration may be utilized.

Having fully described the invention, it is intended that it be limited only by the lawful scope of the appended claims.

I claim:

1. A transparent composite armor material having a surface adapted to receive impact comprising a layer of an organic high molecular weight polymeric matrix having contained therein a plurality of separate transparent high modulus reinforcing sheet members having at least one major plane surface disposed at an acute angle with respect to the surface of said armor adapted to receive impact.

2. A transparent composite armor material having a surface adapted to receive impact comprising a layer of an organic high molecular weight polymeric matrix having contained therein a plurality of separate transparent glass reinforcing sheet members having at least one major place surface disposed at an angle of less than 90° with respect to the surface of said armor adapted to receive impact.

3. A transparent composite armor material having a surface adapted to receive impact comprising a layer of epoxy resin polymer matrix having contained therein a plurality of separate transparent high modulus reinforcing sheet members having at least one major plane surface disposed at an angle of less than 90° with respect to the surface of said armor adapted to receive impact.

4. A transparent composite armor material having a surface adapted to receive impact comprising a layer of an organic high molecular weight polymeric resin matrix having contained therein a plurality of separate transparent high modulus reinforcing sheet members having at least one major plane surface disposed at an angle of less than 90° with respect to the surface of said armor adapted to receive bullet impact, and having firmly adhered to the back of said layer a uniform polymer layer to contain spall produced by the impact.

5. A transparent composite armor material having a surface adapted to receive impact comprising a layer of an organic high molecular weight polymeric resin matrix having contained therein a plurality of separate transparent high modulus reinforcing sheet members comprising elongated thin sheets lying in parallel planes and adhered to each other by said resin, each of said sheets having at least one major plane surface disposed at an angle of less than 90° with respect to the surface of said armor adapted to receive impact.

6. A transparent composite armor material having a surface adapted to receive impact comprising a layer of an organic high molecular weight polymeric resin matrix having contained therein a plurality of high modulus reinforcing members comprising elongated prisms of triangular cross section and being constructed of a plurality of thin glass plates adhered to each other by said resin, each prism and each glass plate therein having at least one major plane surface disposed at an angle of less than 90° with respect to the surface of said armor adapted to receive impact.

7. A transparent composite armor material having a surface adapted to receive impact comprising a layer of an organic high molecular weight polymeric resin matrix having contained therein a plurality of separate transparent reinforcing members comprising alternating layers of thin glass sheets and glass spheres lying in parallel planes and adhered to each other by said resin, each of said layers having at least one major plane surface disposed at an angle of less than 90° with respect to the surface of said armor adapted to receive impact.

8. A transparent composite armor material having a surface adapted to receive impact comprising a layer of an organic high molecular weight polymeric resin matrix having contained therein a plurality of separate transparent reinforcing members comprising alternating layers of thin glass sheets and glass spheres lying in parallel planes and adhered to each other by said resin, each of said layers having at least one major plane surface disposed at an angle of less than 90° with respect to the surface of said armor adapted to receive impact, and having firmly adhered to at least one side of said layer a uniform polymer layer to contain spall produced by the impact.

9. A transparent composite armor material having a surface adapted to receive impact comprising a layer of an organic high molecular weight polymeric resin matrix having contained therein a plurality reinforcing members comprising uniform rectangular thin glass sheets lying in parallel planes and adhered to each other by said resin, each sheet having at least one major surface disposed at an angle of less than 90° with respect to the surface of said armor adapted to receive impact and the edges of said sheets forming a saw-tooth configuration at and underlying the surface of said armor.

10. A transparent composite armor material having a surface adapted to receive impact comprising a layer of an organic high molecular weight polymeric resin matrix having contained therein a plurality reinforcing members comprising uniform rectangular thin glass sheets lying in parallel planes and adhered to each other by said resin, each sheet having at least one major surface disposed at an angle of less than 90° with respect to the surface of said armor adapted to receive impact and the edges of said sheets forming a saw-tooth configuration at and underlying the surface of said armor, and having firmly adhered to at least one side of said layer a uniform polymer layer to contain spall produced by the impact.

11. A transparent composite armor material having a surface adapted to receive impact comprising a layer of an organic high molecular weight polymeric resin matrix having contained therein a plurality reinforcing members comprising uniform rectangular thin glass sheets having a plurality of glass spheres imbedded therein, said sheets each having at least one major surface disposed at an angle of less than 90° with respect to the surface of said armor adapted to receive impact and the edges of said sheets forming a saw-tooth configuration at and underlying the surface of said armor.

12. A transparent composite armor material having a surface adapted to receive impact comprising a layer of an organic high molecular weight polymeric resin matrix having contained therein a plurality reinforcing members comprising uniform rectangular thin glass sheets having a plurality of glass spheres imbedded therein, said sheets each having at least one major surface disposed at an angle of less than 90° with respect to the surface of said armor adapted to receive impact and the edges of said sheets forming a saw-tooth configuration at and underlying the surface of said armor, and having firmly adhered to at least one side of said layer a uniform polymer layer to contain spall produced by the impact.

13. A transparent composite armor material having a surface adapted to receive impact comprising two layers of an organic high molecular weight polymeric resin matrix each having contained therein a plurality of high modulus reinforcing members each having at least one major plane surface disposed at an angle of less than 90° with respect to the surface of said armor adapted to receive impact, the two layers being adhered together in spaced apart relation by means of an organic high molecular weight resin layer containing glass columns of equal length but of unequal fracture stress so that upon impact some of the columns will fracture while others remain intact.

14. A transparent composite armor material having a surface adapted to receive impact comprising two layers of an organic high molecular weight epoxy resin matrix each having contained therein a plurality of glass reinforcing members each having at least one major plane surface disposed at an angle of about 45° with respect to the surface of said armor adapted to receive impact, the two layers being adhered together in spaced apart relation by means of an organic high molecular weight resin layer containing glass columns of equal length but of unequal fracture stress so that upon impact some of the columns will fracture while others remain intact.

15. A transparent composite armor material having a surface adapted to receive impact comprising two layers of an organic high molecular weight polymeric matrix each having contained therein a plurality of high modulus reinforcing members each having at least one major plane surface disposed at an angle of less than 90° with respect to the surface of said armor adapted to receive impact, one of said layers having adhered to at least one side thereof a uniform polymer layer to contain spall produced by impact, the two layers being adhered together in spaced apart relation by means of an organic high molecular weight polymer layer containing glass columns of equal length but of unequal fracture stress so that upon impact some of the columns will fracture while others remain intact.

16. A transparent composite armor material having a surface adapted to receive impact comprising two layers of an organic high molecular weight polymeric matrix each having contained therein a plurality of high modulus reinforcing members comprising uniform rectangular thin glass sheets lying in parallel planes and adhered to each other by said polymer, each having at least one major plane surface disposed at an angle of less than 90° with respect to the surface of said armor adapted to receive impact, one of said layers having adhered to at least one side thereof a uniform polymer layer to contain spall produced by impact, the two layers being adhered together in spaced apart relation by means of an organic high molecular weight polymer layer containing glass columns of equal length but of unequal fracture stress so that upon impact some of the columns will fracture while others remain intact.

17. A transparent composite armor material having a surface adapted to receive impact comprising two layers of an organic high molecular weight polymeric matrix each having contained therein a plurality of reinforcing members comprising alternating layers of thin glass sheets and glass spheres lying in parallel planes and adhered to each other by said polymer, each of said sheets having at least one major plane surface disposed at an angle of less thn 90° with respect to the surface of said armor adapted to receive the impact, one of said layers having adhered to at least one side thereof a uniform polymer layer to contain spall produced by impact, the two layers being adhered together in spaced apart relation by means of an organic high molecular weight polymer layer containing glass columns of equal length but of unequal fracture stress so that upon impact, some of the columns will fracture while others remain intact.

18. A transparent composite armor material comprising three layers of an organic high molecular weight polymeric matrix each having contained therein a plurality of high modulus reinforcing members comprising uniform rectangular thin glass sheets lying in parallel planes and adhered to each other by said polymer, each of said sheets having at least one major plane surface disposed at an angle of less than 90° with respect to the surface of said armor adapted to receive the impact, the first and the second layers of said armor material being adhered together in spaced apart relation by means of an organic high molecular weight polymer layer containing glass columns of equal length but of unequal fracture stress so that upon impact, some of the columns will fracture while others remain intact, and the second and third layers of said armor material being separated by a uniform polymer layer to contain spall produced by impact.

References Cited

UNITED STATES PATENTS

| | | | |
|---|---|---|---|
| 1,888,042 | 11/1932 | Lynn et al. | 109—85 |
| 2,758,951 | 8/1956 | Case | 161—60 |
| 787,065 | 4/1905 | White | 109—84 |
| 952,877 | 3/1910 | Coles | 109—82 |
| 2,019,118 | 10/1935 | Carothers | 161—203 |
| 3,009,845 | 11/1961 | Wiser | 161—404 |
| 3,135,645 | 6/1964 | Burkley | 161—404 |

FOREIGN PATENTS

| | | |
|---|---|---|
| 235,828 | 10/1961 | Australia. |
| 227,168 | 8/1943 | Switzerland. |
| 817,596 | 3/1937 | France. |

REINALDO P. MACHADO, *Primary Examiner.*